No. 630,771. Patented Aug. 8, 1899.
H. F. BLACKWELL, Jr.
METHOD OF FORMING DIES.
(Application filed Mar. 9, 1898.)

(No Model.)

WITNESSES:
Joshua Bergstrom
C. R. Ferguson

INVENTOR
H. F. Blackwell Jr.
BY Munn
ATTORNEYS.

UNITED STATES PATENT OFFICE.

HENRY F. BLACKWELL, JR., OF NEW YORK, N. Y., ASSIGNOR TO MAUDE A. BLACKWELL, OF SAME PLACE.

METHOD OF FORMING DIES.

SPECIFICATION forming part of Letters Patent No. 630,771, dated August 8, 1899.

Application filed March 9, 1898. Serial No. 673,160. (No model.)

*To all whom it may concern:*

Be it known that I, HENRY F. BLACKWELL, Jr., of New York, (Brooklyn,) in the county of Kings and State of New York, have invented new and useful Improvements in Methods of Forming Dies, of which the following is a full, clear, and exact description.

This invention relates to a method of manufacturing embossing-dies; and the object is to produce a die at an extremely low cost as compared with the usual cut dies.

I will describe my invention and then point out the novel features in the appended claim.

Reference is to be had to the accompanying drawings, forming a part of this specification, in which similar characters of reference indicate corresponding parts in both views.

Figure 1:
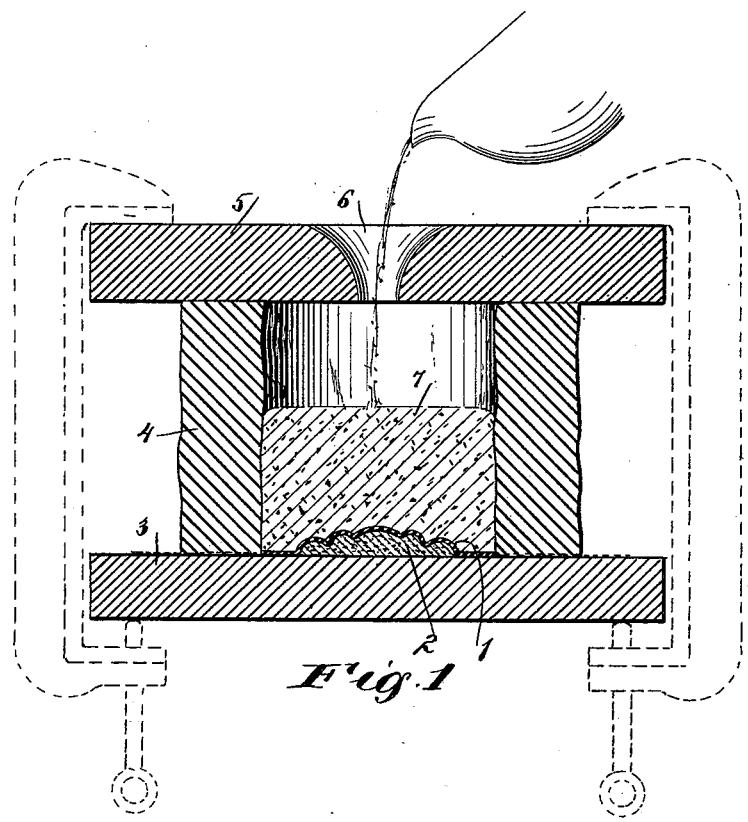
Figure 2:
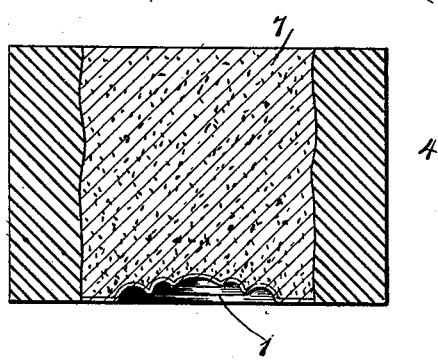

Figure 1 is a sectional elevation of a die during the process of manufacture, and Fig. 2 is a sectional elevation of a finished die.

In carrying out my process a positive is first obtained of the article to be reproduced, either by carving, casting in plaster, or by any other suitable means. From this positive an electrotype 1 is taken in iron or other suitable metal by means of suitable solutions. The deposition of metal is continued until a sufficient thickness is obtained. Then the electrotype is to be removed from the positive. To prevent the iron electrotype from being distorted during the subsequent operation of forming the die, I fill its negative or intaglio face with a supporting compound 2— such, for instance, as a mixture of Portland cement and black-lead slightly dampened, so as to expand slightly when heated and form a practically solid support that may be easily removed. I then place it face down on a smooth iron plate 3, gently rubbing it to make the edges come in contact with the plate. An iron casing, ring, or cylinder 4 of suitable size and shape is then placed around the electrotype as it lies on the iron plate, after which a plate 5, provided with a gate 6, is placed upon the upper end of the ring or cylinder, and then the assembled parts are to be firmly clamped together. The ring or cylinder is to be filled with molten iron 7 or any other hard metal or alloy that will fuse with the iron electrotype. After cooling the electrotype 1, the ring or cylinder 4, and the filling 7 will be practically in one piece, and after removing it from the plates 3 and 5 the die may be placed in a lathe and trued up and finished to size, as indicated in Fig. 2.

From the above description it is obvious that a die may be formed at a comparatively small cost and mostly without the employment of skilled labor, and owing to its cheapness it will be found of great utility in the manufacture of metal ornaments and cheap jewelry in which the styles or patterns are so often changed.

Having thus described my invention, I claim as new and desire to secure by Letters Patent—

The method of forming a die, consisting in making an electrotype of the article to be reproduced, removing the electrotype from the article, then filling the intaglio of the electrotype with a supporting compound, then forming a composite backing by surrounding the electrotype with a shell or band, then pouring molten metal into the shell or band upon the back of the electrotype to form a filling, thus causing the filling, the shell or band and the electrotype to unite as a whole, then removing the supporting compound and finally truing up the die.

HENRY F. BLACKWELL, JR.

Witnesses:
 EVERARD BOLTON MARSHALL,
 C. R. FERGUSON.